United States Patent [19]

Murakami et al.

[11] Patent Number: 4,508,953
[45] Date of Patent: Apr. 2, 1985

[54] METHOD OF MULTI-LAYER WELDING

[75] Inventors: Tsudoi Murakami, Ashiya; Shoji Nasu, Kobe; Kazuaki Tatsumi, Kamakura; Yasuhide Nagahama, Kobe, all of Japan

[73] Assignee: Kabushiki Kaisha Kobe Seiko Sho, Kobe, Japan

[21] Appl. No.: 487,687

[22] Filed: Apr. 22, 1983

[30] Foreign Application Priority Data

Apr. 27, 1982 [JP] Japan ............................... 57-71791
Apr. 30, 1982 [JP] Japan ............................... 57-73679

[51] Int. Cl.³ .............................................. B23K 9/12
[52] U.S. Cl. ........................... 219/125.1; 219/124.22; 219/125.12; 228/7; 228/9; 901/42
[58] Field of Search ................ 219/124.34, 124.22, 219/125.12, 125.1, 125.11; 901/42; 318/573; 228/7, 8, 9

[56] References Cited

U.S. PATENT DOCUMENTS 4,031,369 6/1977 Heaman et al. ..................... 318/573
4,249,062 2/1981 Hozumi et al. ................. 219/124.34
4,448,342 5/1984 Abe et al. ....................... 219/124.34

Primary Examiner—Clifford C. Shaw
Attorney, Agent, or Firm—Oblon, Fisher, Spivak, McClelland & Maier

[57] ABSTRACT

A method of multi-layer welding in which the welding operation is performed according to a path of welding defined by interpolating a plurality of instructed points by a suitable line, the method being characterized by storing in a memory device the coordinates actually passed by a welding torch in the welding operation of the first layer at the instructed points and determining the welding path of the second and succeeding layers by adding a predetermined amount of shift to the actual detected coordinates stored in the memory device at the instructed points and interpolating the shifted coordinates by a suitable line. According to another aspect of the present invention, therefor provided is a method for controlling the locus of operation in the second and succeeding layers in a multi-layer welding operation by a teach/playback type robot including an arithmetic control mechanism the method being characterized by teaching an arcuate locus of operation of the first layer; utilizing as a parameter a shift width corresponding to the arcuate bead to be formed in the second and succeeding layers through an external input member; determining the direction of shift of the second and succeeding layers by calculating the inner product of the directional vector of a welding torch according to the teaching data of the first layer and a directional vector from a point on the arcuate locus of operation to the center of the arc; and calculating the locus of operation of the second or a succeeding layer from the shift direction and width by the arithmetic control mechanism.

11 Claims, 17 Drawing Figures

METHOD OF MULTI-LAYER WELDING

BACKGROUND OF THE INVENTION

1. Field of the Invention

This invention relates to a method for performing a multi-layer welding operation automatically along predetermined paths of welding by reading out preinstructed points.

2. Description of the Prior Art

The control of the weaving path of a welding torch in response to variations in the welding current signal utilizes the phenomenon that the welding current is lowered by an increase in the distance from the contact tip to the base material when a predetermined voltage is applied to the arc welding wire through the contact tip. For example, when the weaving motions of a welding torch 101 to the left and right sides of the center line of a gap 100 are of the same width as shown in FIG. 1, the welding current takes a waveform as shown in FIG. 2, which consists of waves A-B-A and A-C-A of the same shape. However, if the weaving motion of the welding torch 3 is deviated to one side as shown in FIG. 3, the wave A-B-A becomes greater than the wave A-C-A, shown as an asymmetric waveform. In such a case, the average current values in the period A-C-A are compared and the position of the torch is corrected toward the side with a smaller average current. The torch position may be corrected by comparing the peak currents at points B and C instead of the average currents.

However, if the weaving motion is controlled by the above-described method in a multi-layer welding operation, the welding current of the second layer takes an asymmetric waveform as shown in FIG. 6 due to the influence of the existence of the first layer. In a case where the bead of the first layer is flat, the right half of the waveform is flattened, making it difficult to detect the peak value. Consequently, in the second and succeeding layers, it is impossible to discriminate the position of the torch correctly for the control of the weaving path simply by comparing the left and right waveforms of the welding current as in the welding operation of the first layer. Even if the control should employ different criteria in judging the position of the torch in the second and succeeding layers, it lacks versatility since the welding current takes different waveforms in the second, third and fourth layers and depends upon the welding condition.

SUMMARY OF THE INVENTION

It is an object of the present invention to eliminate the above-mentioned problems or difficulties.

A more particular object of the present invention is to provide a method of multi-layer welding in which the welding paths in the second and succeeding layers are determined on the basis of stored positional data of the first layer and a preinstructed shift width of the welding operations of the second and succeeding layers automatically.

It is another object of the present invention to provide a method of multi-layer welding in which the locus of operation of the second or a succeeding layer is automatically determined by a specified shift width and a shift direction calculated according to the teaching data of the locus of operation of the first layer.

According to one aspect of the present invention, there is provided a method of multi-layer welding in which the welding operation is performed according to a path of welding defined by interpolating a plurality of instructed points by a suitable line, said method being characterized by: storing in a memory device the coordinates actually passed by a welding torch in the welding operation of the first layer at the instructed points and determining the welding path of the second and succeeding layers by adding a predetermined amount of shift to the actual detected coordinates stored in the memory device at the instructed points and interpolating a suitable line between the shifted coordinates.

According to another aspect of the present invention, there is also provided a method for controlling the locus of operation in the second and succeeding layers in a multi-layer welding operation by a teach/playback type robot including arithmetic control means, said method being characterized by teaching an arcuate locus of operation of the first layer; giving as a parameter a shift width corresponding to the arcuated bead to be formed in the second and succeeding layers through external input means; determining the direction of shift of the second and succeeding layers by calculating the inner product of the directional vector of a welding torch according to the teaching data of the first layer and a directional vector from a point on the arcuate locus of operation to the center of the arc; calculating the locus of operation of the second or a succeeding layer from the shift direction and with by the arithmetic control means.

The above and other objects, features and advantages of the present invention will become apparent from the following description and the appended claims, taken in conjunction with the accompanying drawings which show by way of example illustrative embodiments of the invention.

BRIEF DESCRIPTION OF THE DRAWINGS

In the accompanying drawings

DETAILED DESCRIPTION OF THE PREFERRED EMBODIMENTS

Figure 7:
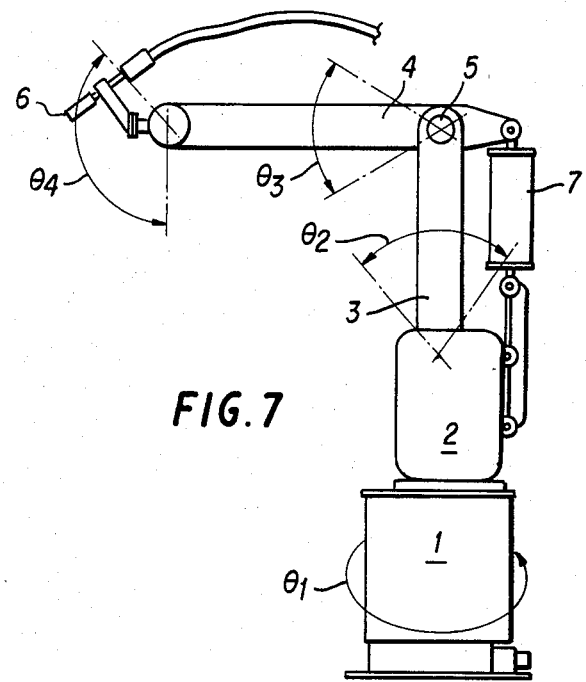
FIG. 7 is a front view of a welding robot to which the present invention is applicable.

Referring to FIG. 7, there is illustrated a welding robot with a base 1 which is rotatable in the direction of $\theta_1$ by means of a brake motor (not shown) which is accommodated in the base 1. Mounted on the base 1 is an arm wrist drive 2 which tiltably supports thereon a vertical arm 3 and a horizontal arm 4 which is vertically swingably connected to the upper end of the vertical arm 3 through a pivoting pin 5. A welding torch 6 is pivotally supported at the fore free end of the horizontal arm 4. The rear end of the horizontal arm 4 is connected to a spring balance mechanism 7.

Provided in the arm wrist drive 2 are a brake motor (not shown) and a clutch (not shown) which disconnectibly couples the brake motor with the tilting mechanism of the vertical arm 3.

The angle of inclination $\theta_2$ of the vertical arm 3 is retained by the spring balance mechanism 7 to keep the same posture when it is stopped.

Figure 8:
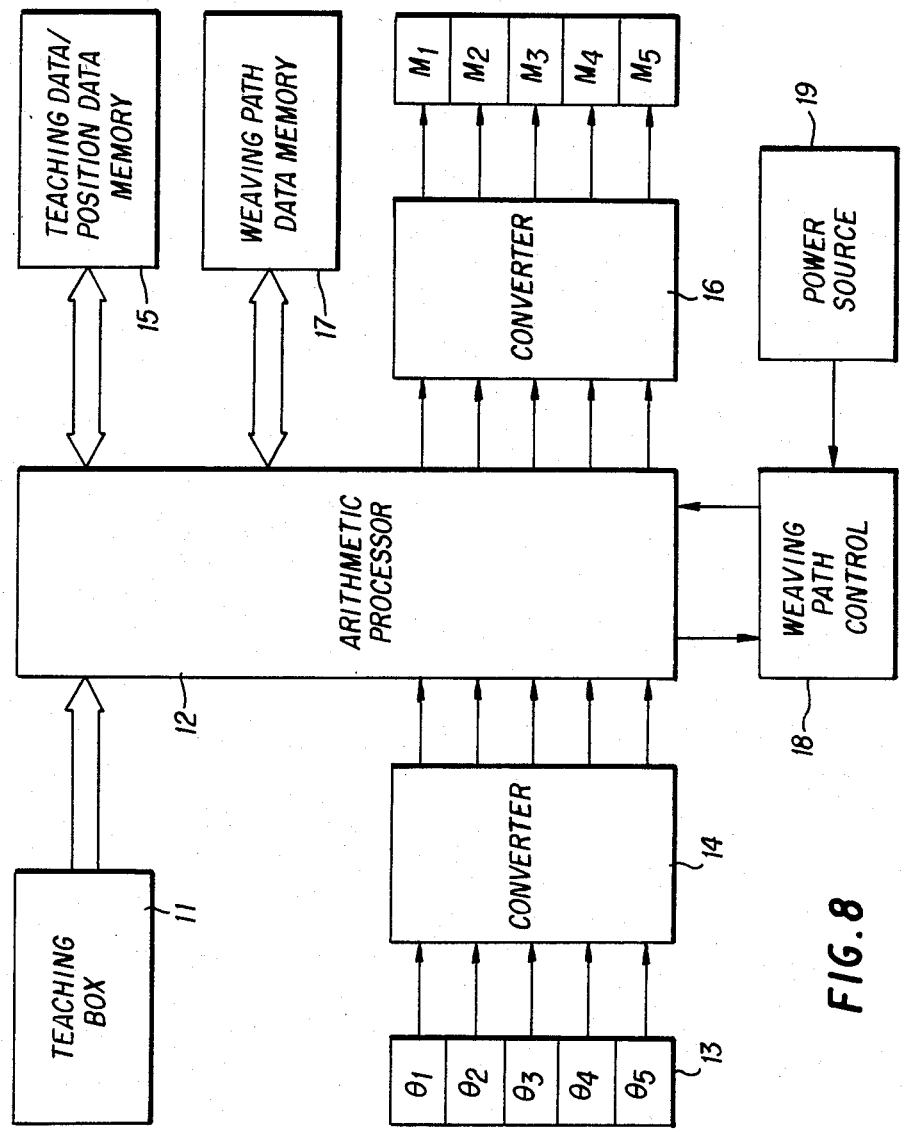
FIG. 8 is a diagram of the control circuit for the welding machine of FIG. 7.

Referring to FIG. 8, there is shown a control system including a teaching or instruction box 11 through which instruction signals are supplied to an arithmetic processor 12, e.g., a position data storage command, a welding start/stop command, welding conditions such as welding current, voltage and speed, a shielding gas ON/OFF signal, a command of either linear or arcuate interpolation, multi-layer welding conditions and the like.

In response to the position data storage signal, the arithmetic processor is supplied with positional input data $\theta_1, \theta_2, \ldots \theta_5$ of the respective shafts including the vertical and horizontal arms 3 and 4 from an encoder position detector 13 through a converter 14. These input data are stored in instruction/position data memory device 15.

At the time of playback, the data in the memory device 15 are fed to the arithmetic processor 12 and, after arithmetic operation thereat, to the motors $M_1$ to $M_5$ through the converter 16 to control the respective arms including the arms 3 and 4.

Indicated at 17 is a memory device for storing the data of the weaving path, and at 18 a weaving path control which is supplied from the arithmetic processor 12 with signals indicative of the opposite reversing ends of the weaving motion to detect the welding wire current at these reversing end points, sending to the arithmetic processor 12 signals indicative of the amount of deviation from a correct position. According to the received data of deviation, the arithmetic processor 12 adds the amounts of deviation to the positional data from the instruction box 11, storing the corrected data in the weaving path data memory device 17. Reference numeral 19 denotes a welding power source.

Figure 9:
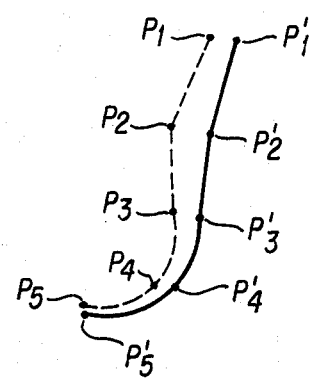
FIG. 9 is a diagrammatic illustration showing an example of welding pass.

With the above-described control system, now assuming that a desired welding path extends as indicated by broken line in FIG. 9 and the control system of FIG. 8 is instructed to trace the points $P_1$ to $P_5$, the coordinates of the instructed points $P_1$ to $P_5$ are fed to the arithmetic processor 12 from the instruction box 11 and stored in the memory 15. Such is also instructed to effect linear interpolation of the welding path from point $P_1$ to $P_3$ and circular interpolation from point $P_3$ to $P_5$.

Figures 10, 12:
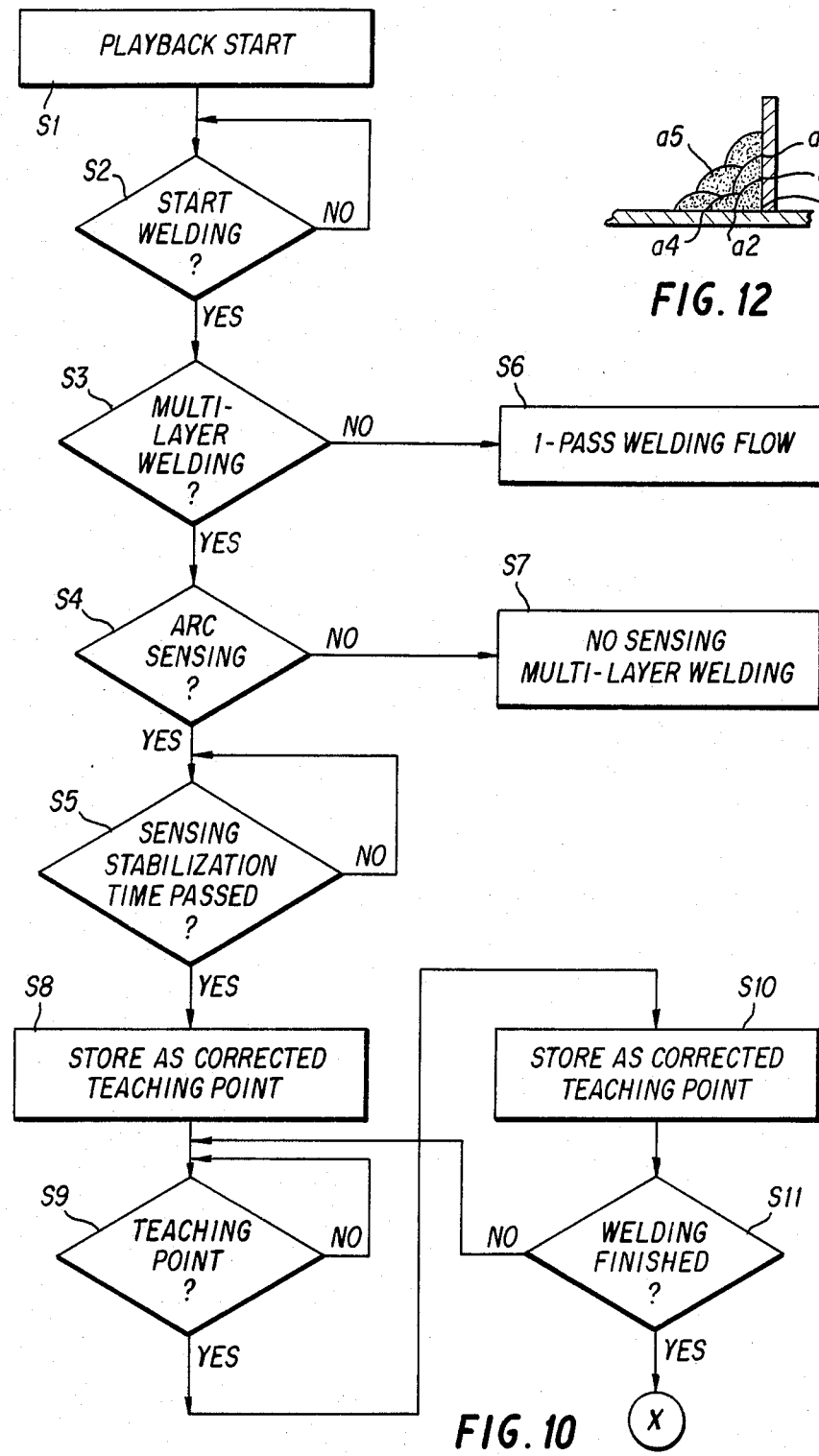
FIGS. 10 and 11 are flowcharts showing an embodiment of the present invention.
FIG. 12 is a diagrammatic illustration showing one example of the multi-layer welding operation.
Figure 11:
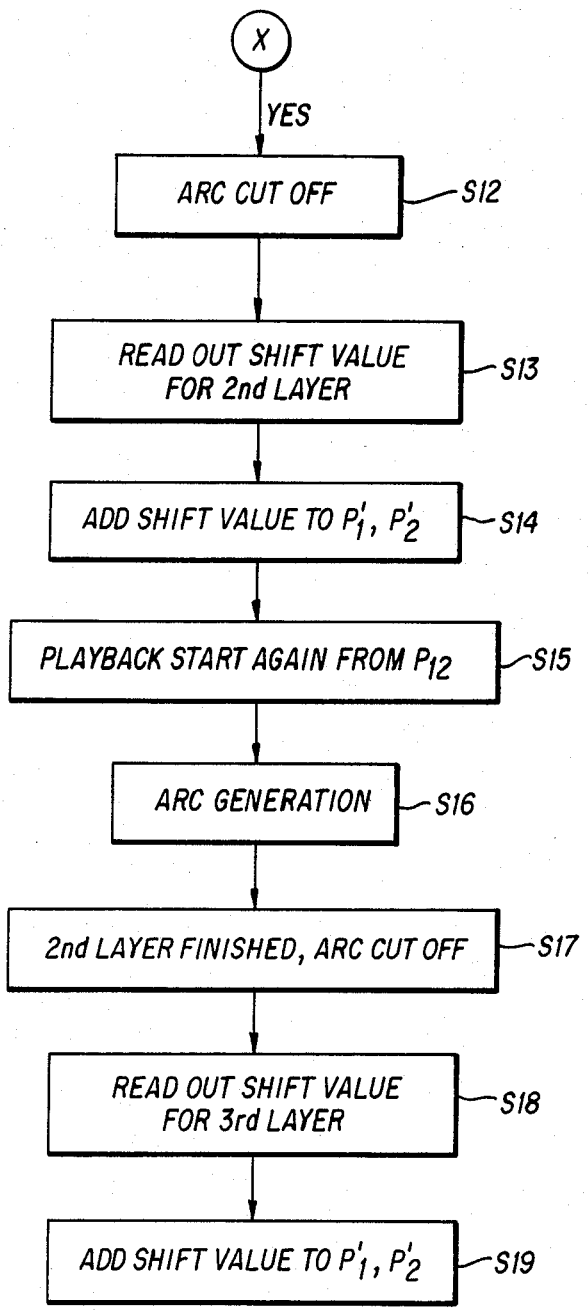

In order to control the torch to trace the welding paths $a_1, a_2, a_3 \ldots$ in a multi-layer fillet welding as shown in FIG. 12, the amount of shift, for example, the amount of shift $\Delta S$ from $a_1$ to $a_2$ or $a_3$ and the shift $2\Delta S$ from $a_1$ to $a_4$ are stored in the instruction data/positional data memory device and read out when welding the corresponding layers. Further, the program shown in FIGS. 10 and 11 is loaded in the arithmetic processor 12.

Figure 1:
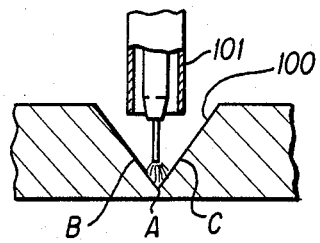
FIG. 1 is a diagrammatic sectional view showing one example of the method for detecting the welding pass by way of the welding current.
Figure 2:
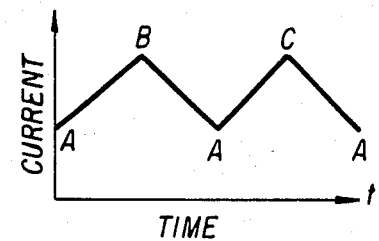
FIG. 2 is a diagram of the current waveform obtained by the method of FIG. 1.
Figure 3:
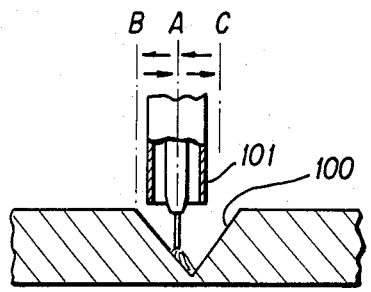
FIG. 3 is a diagrammatic sectional view showing the welding torch as deviated from the center line in the method of FIG. 1.
Figure 4:
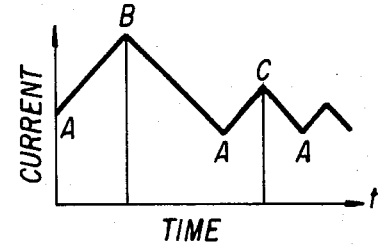
FIG. 4 is a diagram of the waveform as obtained when the torch is in deviated state as shown in FIG. 3.
Figure 5:
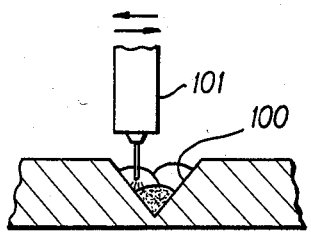
FIG. 5 is a diagrammatic sectional view showing a state in which a number of layers are formed in the method of FIG. 1.
Figure 6:
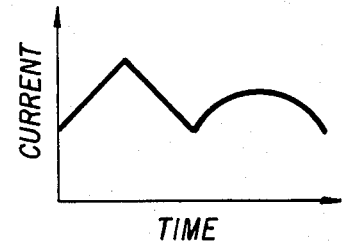
FIG. 6 is a diagram of the waveform as obtained in the state of FIG. 5.

In multi-layer welding, if the control proceeds from step $S_1$ to $S_5$ in the operation of the first layer and then to step $S_8$ after a lapse of sensing stabilizing time, the welding torch is fed to the instructed point $P_1$ and given a weaving motion, while detecting the actual position $P_1'$ of the welding torch by the method as described hereinbefore in connection with FIGS. 1 and 2 to detect the deviation as caused by the set position of the workpiece. In the next place, the welding torch is fed to the next instructed point $P_2$, similarly detecting the actual position $P_2'$ in steps $S_9$ and $S_{10}$. Up to the last instructed point $P_5$, the actual positions $P_3'$ to $P_5'$ of the welding torch are sequentially detected in the same manner, and the respective coordinates are stored in the welding path memory device 17.

If the control advances to step $S_{12}$ after completing the welding of the first layer, the arc is cut off and the shift amount $\Delta S$ of the welding torch for the second layer is read out in step $S_{13}$. In the next step $S_{14}$, the values of $\Delta S + P_1'$, $\Delta S + P_2' \ldots$ are calculated to determine the welding path for the second layer using the calculated values $\Delta S + P_1'$, $\Delta S + P_2' \ldots$ as instruction points. According to the welding path thus determined, the motors M to M are controlled to effect the welding of the second layer. The welding paths of the third and succeeding layers are determined and traced in the same manner.

As is clear from the foregoing description, the method of the present invention can automatically determine the welding paths of the second and succeeding layers by calculations based on the data of the actual welding path of the first layer, ensuring accurate control of the welding paths in multi-layer welding without having to resort to the errorneous welding current signals for the control of welding paths of the second and subsequent layers.

The principles of the above-described method of the present invention can also be applied to a teach/playback type welding robot to carry out the operation automatically after teaching the locus of operation of the first layer, obviating the troublesome operations for teaching or instructing the shift amounts for the second and succeeding layers.

Figure 13:
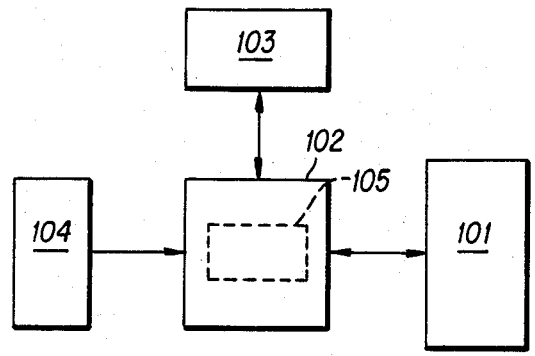
FIG. 13 is a block diagram of a welding robot system incorporating the present invention.

Referring to FIG. 13, there is shown in block diagram form a welding robot system, including a teach/playback type robot 101 with a control section 102 for controlling the operation of the robot 101, a memory device 103 for storing the operational data of the robot 101 and welding conditions, and a manual input device 104 such as a control panel or the like for sending command signals or input data to the control device 102.

The control device 102 is provided with an arithmetic processor 105 which constitutes the center of the control system and includes a microprocessor or a microcomputer. The arithmetic processor 105 carries out calculations on the basis of the data stored in the memory device 103 (and the positional data of the position detector of the robot 101), moving the robot 101 between certain points according to the results of calculations to control its position and speed. For control of position, there may be employed a functional interpolation system for controlling the path (or locus) of welding torch.

Figure 14:
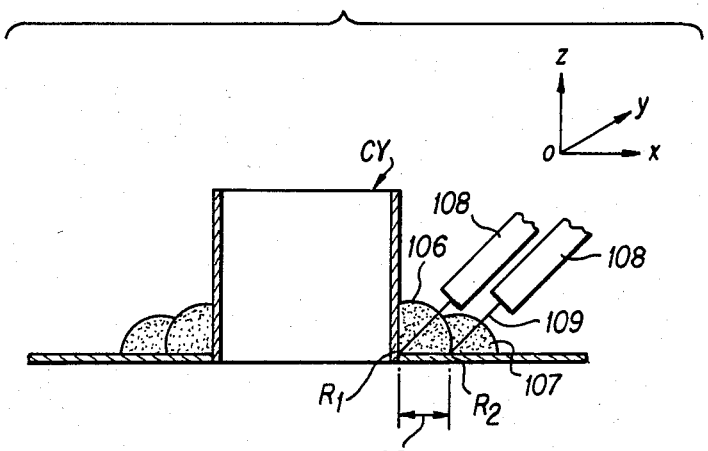
FIG. 14 is a diagrammatic illustration explanator of the operation of the embodiment shown in FIG. 13.
Figure 15:
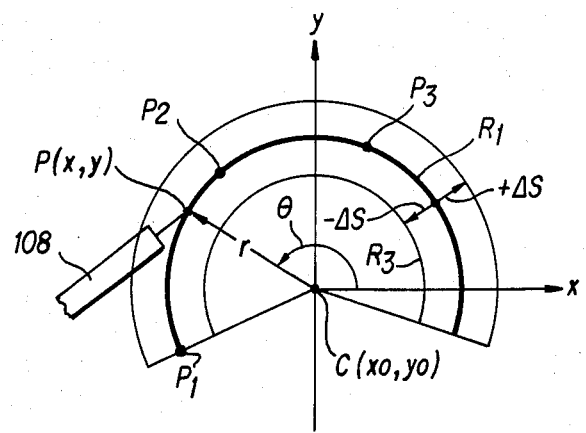
FIG. 15 is a diagrammatic illustration showing the relationship between the loci of operation of the second and third layers.

In order to perform multi-layer fillet welding of a cylindrical joint CY as shown in FIG. 14 by the above-mentioned robot system, the locus of the welding path is controlled in the following manner. In the first place, the arcuate locus $R_1$ which corresponds to the bead 106 is taught to the robot when the first layer is formed, followed by input of the amount of shift $\Delta S$. Thereafter, the direction of shift (for the second or succeeding layers) is automatically determined by the robot according to the instructed arcuate locus $R_1$ and the amount of shift $\Delta S$, forming the bead 107 of the second layer along an arcuate locus $R_1$ with a shift $\Delta S$. In FIG. 14, indicated at 108 is a welding torch and at 109 a welding wire.

Reference is now had to FIG. 14 which is an imaginary view of the welding operation of FIG. 14 as projected on x-y plane (horizontal plane), in which the points $P_1(x_1, y_1)$, $P_2(x_2, y_2)$ and $P_3(x_3, y_3)$ are positional data of the first layer which are stored by the PTP method. Since an arc can be defined invariably by presentation of three points, the center C $(x_0, y_0)$ of the arcuate locus $R_1$ can be computed from the three positional data. Consequently, at the time of playback, the arcuate path of welding through the points $P_1$ to $P_3$ and an arbitrary point $P(x, y)$ in an extensional area can be obtained by arcuate interpolation by the arithmetic processor 105. Namely, the data $P(x, y)$ of the arcuate locus of the first layer can be expressed by the following equations (1) as an angle $\theta$ taken in the forward direction from the direction x.

$$\left. \begin{array}{l} x = x_0 + r \cdot \cos\theta \\ y = y_0 + r \cdot \sin\theta \end{array} \right\} \quad (1)$$

The loci of the second and succeeding layers can be obtained by shifting the locus $R_1$ of the first layer in the radial direction. More specifically, the loci $R_2$ and $R_3$ can be obtained by a shift of $+\Delta S$ and a shift of $-\Delta S$, respectively. The positional data $P_1(x_1, y_1)$, $P_2(x_2, y_2)$ and $P_3(x_3, y_3)$ are stored in the memory device 103 of FIG. 13, while the center position $C(x_0, y_0)$ and the radius C are stored also in the memory device 103 or in a predetermined numeric storage area of the control section 102 and the amount of shift $\Delta S$ is manually placed in a predetermined numeric storage area of the memory device 103 or the control section 102 through the manual input device 104. Therefore, the loci of the second and succeeding layers $P_s(x_s, y_s)$, for instance, the locus $R_2$ or $R_3$ of the second layer is expressed by the equations (2)

$$\left. \begin{array}{l} x_s = x_0 + (r \pm S) \cdot \cos\theta \\ y_s = y_0 + (r \pm \Delta S) \cdot \sin\theta \end{array} \right\} \quad (2)$$

and these values are computed by the arithmetic control processor 105. In the foregoing equations (2), the positive and negative signs $\pm$ indicate the direction of shift relative to the instructed arcuate locus $R_1$. For example, it is predetermined that the positive and negative signs represent outward and inward shifts from the arc $R_1$, respectively.

Figure 16:
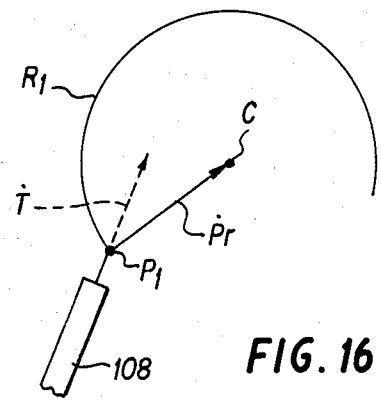
FIG. 16 is a diagrammatic illustration explanatory of the principles for determining the shift direction.

In the next step, the direction of the shift is determined automatically by means of the inner product of the vector. As shown particularly in FIG. 16, a directional vector $\vec{T}$ of a welding torch 108 has components $l_T$ and $m_T$ in the x- and y-directions, respectively. These vector components $l_T$ and $m_T$ form the cosines of the torch direction when the data of the point P is stored, and therefore their data are also stored in the memory device 103 along with the data $(x_1, y_1)$. On the other hand, the vector $\vec{P}_r$ which is directed toward the center of arc at the point $P_1$ on the arcuate locus of operation $R_1$ is expressed by the relationship $$\vec{P}_r = \vec{P_1 C} = (x_0 - x_1, y_0 - y_1) = (x_{01}, y_{01})$$

The value of $(x_{01}, y_{01})$ can be calculated from the data of $P_1(x_1, y_1$ and $C(x_0, y_0)$. The inner product A of the directional vectors $\vec{T}$ and $\vec{P}_r$ which form an angle $\phi$ can be expressed by the following equation (4).

$$A = |\vec{P}_r| |\vec{T}| \cos\phi = x_1 \cdot m_T + y_1 \cdot l_T \quad (4)$$

Therefore, as clear from the definition of the inner product, the welding torch is on the outer side of the arcuate welding line with a shift in the outward $(+)$ direction when $A > 0$, and with a shift in the inward $(-)$ direction when $A < 0$.

Figure 17:
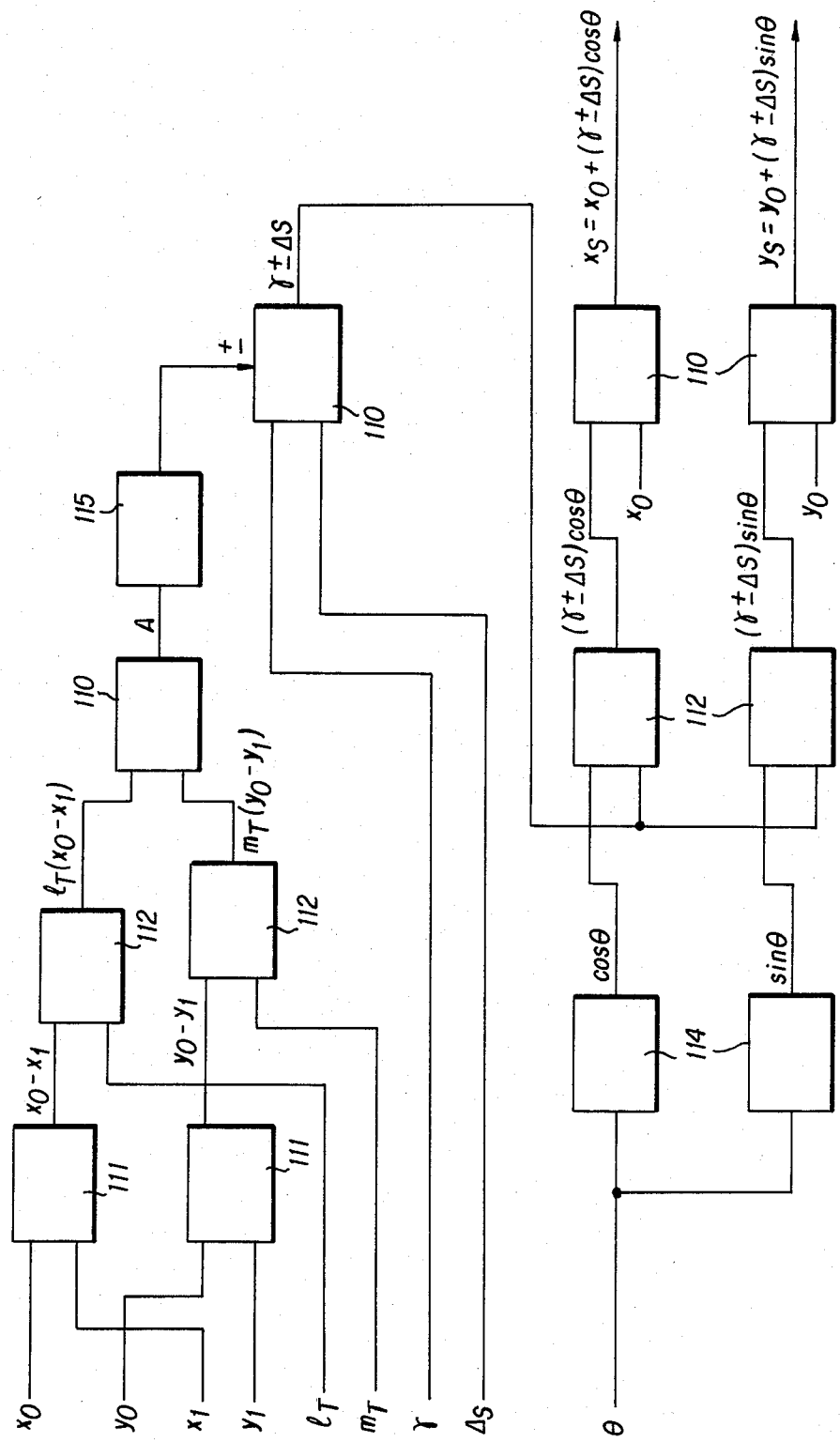
FIG. 17 is a flowchart of an arithmetic operation process.

Through the foregoing arithmetic operations, the loci of operation of the second and succeeding layers are determined by the arithmetic processor 105 shown in FIG. 1. For this purpose, the arithmetic processor 105 carries out a software program consisting of a plurality of arithmetic steps as illustrated from the standpoint of hardware in FIG. 17. In this figure, the input data which basically consist of the teaching data such as $x_1$, $y_1$, $x_2$, $y_2$, $x_3$, $y_3$, $l_T$, $m_T$ and $\Delta s$ and derivative data such as the center coordinates $(x_0, y_0)$, the radius and the angle $\theta$. The output signals $x_s$ and $y_s$ are the data of the locus of the second layer, with the shifts in the positive $(+)$ or negative $(-)$ direction in the same being order. Denoted at 110 is an adder, at 111 a subtractor, at 112 a multiplier, at 113 a sine calculator. From the data of $x_s$ and $y_s$ thus obtained, an arbitrary point on the arc can be calculated by arcuate interpolation in the same manner as in the first layer.

Referring again to FIG. 14, in the playback operation the bead 106 of the first layer is formed along the instructed arcuate locus $R_1$. After carrying out the operation for the first layer, the shift direction is automatically determined by the robot according to the data relative to the specified shift amount $\Delta S$, shifting the welding path by $\Delta S$ to allow the welding operation to proceed automatically along the calculated locus $R_2$ of the second layer to form a bead 107 therealong.

In this instance, without continuously carrying out the operations for the first and second layers in the above-described manner, the shift amount $\Delta S$ may be instructed after completion of the operation for the first layer through the manual input device shown in FIG. 13. However, if the shift amount $\Delta S$ is given and stored in the memory device 103 beforehand along with the teaching data of the first layer, multi-layer welding operation by the robot can be performed in a fully automated fashion.

Although only two layers are shown in FIG. 14, the above-described method can be applied to welding operations with a greater number of layers, specifying the shift amounts of $\Delta S_1$, $\Delta S_2$, $\Delta S_3$ and so forth which are determined suitably according to the nature of the work and the welding conditions.

Thus, on the basis of the data of the arcuate locus of the first layer which is stored in a teach/playback type welding robot and a shift width which is given as a parameter, the shift direction of the second and succeeding layers are determined by the inner product of the directional vector of the welding torch in the stored data of the first layer and a directional vector from a point on an arcuate locus to the center of the arc, calculating the locus of operation of the second and succeeding layers from the shift direction and width. Therefore, it is possible to perform the multi-layer welding operation automatically according to the specified shift width after forming the bead of the first layer, lessening the manual input of the operation coupled with an advantage that the number of switches of the manual input device can be reduced.

Obviously, numerous modifications and variations of the present invention are possible in light of the above teachings. It is therefore to be understood that within the scope of the appended claims, the invention may be practiced otherwise than as specifically described herein.

What is claimed is:

1. A method of multi-layer welding in which the welding operation is performed according to a path of welding defined by interpolating a suitable line between a plurality of instruction points and which utilizes a welding torch, a memory device and an arithmetic processor, wherein said method comprises:
   storing in said memory device coordinates of a plurality of instruction points that define a desired path for a first welding layer;
   welding said first layer by interpolating a suitable path between said plurality of instructed points;
   detecting coordinates of points actually passed during said welding of said first welding layer;
   storing in said memory device said detected coordinates as teaching points for second and succeeding welding layers; and
   determining welding paths of said second and succeeding layers by adding a predetermined amount of shift to said actually detected coordinates stored in said memory device at said teaching points and interpolating a suitable line between the shifted coordinates by means of said arithmetic processor.

2. The method of multi-layer welding as set forth in claim 1, further utilizing a welding robot having a plurality of motors connected to said arithmetic processor via a converter, and which further comprises automatically controlling said welding torch via said arithmetic processor along the determined path of welding in the welding operation of said second and succeeding layers.

3. The method of multi-layer welding as set forth in claims 1 or 2 further utilizing an instructing box and which further comprises feeding instruction points to said memory device and said arithmetic processor through said instructing box.

4. The method of multi-layer welding as set forth in claim 1, which further comprises interpolating by a straight line.

5. The method of multi-layer welding as set forth in claim 1, which further comprises interpolating by an arcuate line.

6. A method of controlling the locus of operation in second and succeeding layers in multi-layer welding by a teach/playback type robot with an arithmetic processor and which utilizes a memory device, external input means, and a welding torch, wherein said method comprises:
   welding an arcuate first welding layer;
   detecting coordinates of points actually passed during said welding of said arcuate first layer;
   storing in said memory device said detected coordinates as teaching points for second and succeeding welding layers, said teaching points defining an arcuate locus of operation of said first layer;
   utilizing as a parameter a shift width corresponding to an arcuate bead to be formed in said second and succeeding layers through said external input means;
   determining a shift direction of said second and succeeding layers by calculating an inner product of a directional vector of said welding torch according to said teaching points of said first layer and a directional vector from a point on said arcuate locus of operation to a center of the arc; and
   calculating a locus of operation of said second or succeeding layer from the shift direction and width by said arithmetic processor.

7. The method as set forth in claim 6, wherein said memory device includes a predetermined memory area and which further comprises storing said shift width in said predetermined memory area of said memory device.

8. The method as set forth in claim 6, which further comprises specifying said shift width through said external input device.

9. The method as set forth in claim 6, which further comprises loading said arithmetic processor with a program to perform necessary arithmetic operations according to steps of a predetermined sequence.

10. The method as set forth in claim 6, which further comprises the steps of:
    storing in said memory device the coordinates of three instruction points that define a desired path for said arcute first welding layer;
    performing said welding of said arcuate first welding layer using arcuate interpolation of said three points by said arithmetic circuit.

11. A method as set forth in claim 10, wherein said arithmetic processor includes a predetermined memory area and which further comprises storing said shift width in said predetermined memory area of said arithmetic processor.

* * * * *